(12) United States Patent
Bettale et al.

(10) Patent No.: US 11,900,751 B2
(45) Date of Patent: Feb. 13, 2024

(54) ELECTRONIC ACCESS PASS

(71) Applicant: IDEMIA FRANCE, Courbevoie (FR)

(72) Inventors: Luk Bettale, Paris (FR); Emmanuelle Dottax, Talence (FR); Aurélien Greuet, Courbevoie (FR); Nathan Reboud, Paris (FR)

(73) Assignee: IDEMIA FRANCE, Courbevoie (FR)

( * ) Notice: Subject to any disclaimer, the term of this patent is extended or adjusted under 35 U.S.C. 154(b) by 138 days.

(21) Appl. No.: 17/596,477

(22) PCT Filed: Jun. 11, 2020

(86) PCT No.: PCT/FR2020/050993
§ 371 (c)(1),
(2) Date: Dec. 10, 2021

(87) PCT Pub. No.: WO2020/249904
PCT Pub. Date: Dec. 17, 2020

(65) Prior Publication Data
US 2022/0222997 A1    Jul. 14, 2022

(30) Foreign Application Priority Data

Jun. 12, 2019 (FR) ...................................... 1906230

(51) Int. Cl.
*G07C 9/29* (2020.01)
*G07C 9/22* (2020.01)
(Continued)

(52) U.S. Cl.
CPC ......... *G07C 9/29* (2020.01); *G06K 19/07707* (2013.01); *G07C 9/00309* (2013.01);
(Continued)

(58) Field of Classification Search
CPC .. G07C 9/29; G07C 9/22; G07C 2009/00412; G07C 2009/00769; G07C 2209/04; G06K 19/07707
(Continued)

(56) References Cited

U.S. PATENT DOCUMENTS 11,315,376 B2 * 4/2022 Lovelock ................. G07C 9/27
2007/0013610 A1 * 1/2007 Mooney .................... G07C 9/29
345/2.1
(Continued)

FOREIGN PATENT DOCUMENTS

FR        2642200 A1   7/1990
WO    2018127732 A2   7/2018

*Primary Examiner* — Paultep Savusdiphol
(74) *Attorney, Agent, or Firm* — NIXON & VANDERHYE

(57) ABSTRACT

The invention relates to an electronic access pass allowing a person associated with the pass to access at least one restricted-access area of a building, and to a method implemented by such a pass for accessing a restricted-access area of a building. According to some embodiments, when a pass reader authorizes access to said area after reading the pass, information selected on the basis of the restricted-access area is temporarily displayed on the pass. This makes it possible to identify the carrier within the area based on the information displayed on the pass, while at the same time limiting the possibility of information being recovered through a simple glance outside the area. Overall security is thereby improved as a result, both within the area and outside it, due to the temporary nature of the display.

15 Claims, 4 Drawing Sheets

(51) Int. Cl.
*G06K 19/077* (2006.01)
*G07C 9/00* (2020.01)

(52) U.S. Cl.
CPC ..... *G07C 9/22* (2020.01); *G07C 2009/00412* (2013.01); *G07C 2009/00769* (2013.01); *G07C 2209/04* (2013.01)

(58) Field of Classification Search
USPC .......................................................... 235/382
See application file for complete search history.

(56) References Cited

U.S. PATENT DOCUMENTS

| | | | |
|---|---|---|---|
| 2010/0096452 A1* | 4/2010 | Habraken | G07C 9/22 235/382 |
| 2011/0035604 A1* | 2/2011 | Habraken | G07F 7/1016 235/382 |
| 2012/0217303 A1* | 8/2012 | Krawczewicz | G07C 9/28 235/488 |
| 2015/0379283 A1* | 12/2015 | Spodak | G16Z 99/00 705/2 |
| 2016/0055690 A1* | 2/2016 | Raina | H04W 40/244 340/5.61 |
| 2021/0134097 A1* | 5/2021 | Lovelock | G07C 9/27 |

* cited by examiner

ELECTRONIC ACCESS PASS

TECHNICAL FIELD

The invention belongs to the field of security, particularly of access control involving security devices such as access cards or passes. The invention relates, in particular, to an electronic access pass as well as to a method implemented by same in order to access a restricted-access area of a building.

STATE OF THE ART

The present invention advantageously applies to the electronic access cards or passes that allow access to one or more delimited zones, for example inside a building, possibly having to meet different levels of security requirements.

By way of example, in France, restricted-access areas may be defined in the context of the scheme for protecting national scientific and technical potential. For example, in a scientific research laboratory, the required level of security may be higher in an area that has Restricted Area (ZRR) status than in the rest of the laboratory premises.

Obviously, security requirements are not limited to research laboratories and most companies and administrations nowadays are implementing increasingly strict security access policies to regulate entry and movement within their premises.

Conventionally, information such as the address of the premises, the name of the pass carrier, their job title or even their clearance level are printed directly on the access pass, thus allowing a visual inspection.

However, such information could reveal to a third party in the presence of the pass, for example a person from outside the company, personal or confidential information about the person to whom the pass belongs or their company, when this is not desirable. A third party from outside the company could thus determine the address of the premises, identify a person with a high clearance level or even reveal the position held by a person, simply by reading the information printed on the pass. In addition, it is currently easy to obtain details from information read on a pass, using well-known professional social networks.

In this context, organizations prefer to avoid writing certain types of information or even any information at all on access passes. This information is thus contained in a memory of the access pass, and is typically readable by a pass reader.

However, while the absence of printed information on the access pass prevents the retrieval of information through a simple glance by a third party, it can nevertheless be a hindrance to the authentication of the person using the pass. Indeed, in the absence of visible information on the pass, neither security personnel nor peers moving around inside the secure premises can immediately ascertain whether the person presenting the pass actually corresponds to the expected carrier. Indeed, such a verification requires a pass reader and a screen displaying information about the carrier stored in the pass.

Security thus is badly ensured, especially once inside the restricted-access area.

There is therefore a need for an access pass that guarantees both the confidentiality of the information it contains and the authenticity of the person using it.

OVERVIEW OF THE INVENTION

Thus, the aim of the present invention is to overcome at least one of these disadvantages.

In this context, a first aspect of the invention relates to an electronic access pass allowing a person associated with said pass to access at least one restricted-access area of a building, the electronic access pass comprising:
  means for communicating with a pass reader,
  means for displaying information on the electronic access pass,
  the electronic access pass being characterized in that it further comprises a secure element configured to:
  ensure securely storing information in the electronic access pass,
  authenticate the pass reader, the authentication consisting in verifying that the pass reader is actually associated with a restricted-access area of said building,
  control the sending, by the communication means, to said pass reader, of a first item of information originating from the pass in order to authenticate the electronic access pass so as to authorize access to the restricted-access area associated with the authenticated pass reader,
  select a second item of information stored in the electronic access pass, on the basis of the restricted-access area associated with the authenticated pass reader, and
  control the temporary display, by the display means, of the selected second item of information on the electronic access pass, the display being temporary in that it is disabled upon exiting the restricted-access area associated with the authenticated pass reader.

The claimed invention thus makes it possible to identify the carrier within the area based on the information displayed on the pass, while at the same time limiting the possibility of the information being recovered through a simple glance outside the area. Overall security is thereby improved as a result, both within the area and outside it, due to the temporary nature of the display.

Other features of the electronic access pass according to some embodiments of the invention are disclosed in the dependent claims.

In some embodiments, the communication means are of the short-range type.

Advantageously, the short-range communication means allow access controls in all types of premises, including those lacking network coverage (mobile or satellite).

In some embodiments, at least one item of information among the first item of information and the second item of information comprises at least one access right to at least one restricted-access area of said building.

In some embodiments, the access right corresponds to a given access level among several possible access levels. These access levels may for example correspond to clearance levels.

In some embodiments, the first item of information comprises a cryptogram.

In some embodiments, the secure element is configured to control the disabling of the display means upon detecting a predefined event.

These embodiments make it possible to preserve the confidentiality of the information displayed on the pass for example outside an area, even when the person does not present the pass to the reader upon exiting the area. These embodiments are thus particularly useful for preserving the confidentiality of the information in the case in which the carrier of the pass exits a restricted-access area passing "behind" or "with" another person, and thus avoiding presenting their pass to a reader.

In some embodiments, the secure element is configured to select the second item of information on the basis of the result of an authentication of a carrier of the electronic access pass.

In some embodiments, the secure element is configured to implement said authentication of the carrier of the electronic access pass.

In some embodiments, the secure element is configured to generate the first item of information (the information that is used to authenticate the pass) on the basis of the result of an authentication of a carrier of the electronic access pass.

In some embodiments, the pass comprises means for obtaining a personal datum configured to enable a carrier of the electronic access pass to provide an item of personal information on the electronic access pass with a view to authenticating the carrier.

In some embodiments, the display means comprise at least one LED-type indicator light.

In some embodiments, the display means comprise at least one screen.

In some embodiments, the display means comprise electronic ink.

The use of electronic ink enables energy savings since energy is only required when refreshing the display.

A second aspect of the invention relates to a method implemented by an electronic access pass in order to access a restricted-access area of a building, the method comprising the following steps:
 authenticating a pass reader, the authentication consisting in verifying that the pass reader is actually associated with a restricted-access area of said building,
 sending, to said pass reader, a first item of information originating from the pass in order to authenticate the electronic access pass so as to authorize access to the restricted-access area associated with the authenticated pass reader,
 selecting a second item of information stored in the electronic access pass, depending on the restricted-access area associated with the authenticated pass reader, and
 temporarily displaying the selected second item of information on the electronic access pass, the display being temporary in that it is disabled upon exiting the restricted-access area associated with the authenticated pass reader.

Other features of the method according to some embodiments of the invention are disclosed in the dependent claims.

In some embodiments, the method further comprises a step of disabling the display means upon detecting a predefined event.

This disabling is preferably decorrelated from the presentation of the pass to a reader, that is it can take place optionally in advance to passing the pass over a reader placed at the exit of the area.

It provides an extra level of security, for example in situations in which the carrier of the pass does not present their pass to the reader upon exiting the area, thus preventing the pass from disabling the information in cooperation with the pass reader.

In some embodiments, the selection of the second item of information is based upon the result of an authentication of a carrier of the electronic access pass.

In some embodiments, the method further comprises a step of authenticating a carrier of the electronic access pass.

In a particular embodiment, the different steps of the above-mentioned methods are determined by computer program instructions.

As a result, the invention also relates to computer programs on an information medium, these programs being capable of being implemented by a microprocessor, these programs comprising instructions suitable for implementing the steps of the methods as mentioned hereinbefore.

These programs may use any programing language and be in the form of source code, object code, or intermediate code between source code and object code, such as in a partially compiled form or in any other desirable form.

The invention also relates to an information medium that is readable by a microprocessor, and comprising computer program instructions such as mentioned hereinbefore.

The information medium may be any entity or device capable of storing the program. For example, the medium may comprise a storage medium such as a ROM, for example a microcircuit ROM, or a magnetic recording medium, for example a hard drive or even a flash memory.

Additionally, the information medium may be a transmissible medium such as an electrical or optical signal, which may be transmitted via an electrical or optical cable, by radio or by other means. The program according to the invention may in particular be downloaded to a storage platform of an Internet-type network.

Alternatively, the information medium may be an integrated circuit wherein the program is incorporated, the circuit being suitable for executing or for being used in the execution of, the method in question.

The above-mentioned information medium and computer programs have features and advantages that are analogous to the methods that they implement.

BRIEF DESCRIPTION OF THE DRAWINGS

Other particular features and advantages of the invention will become more apparent in the following description, illustrated by the appended figures which depict examples of non-limiting embodiments.

DETAILED DESCRIPTION

Figure 1:
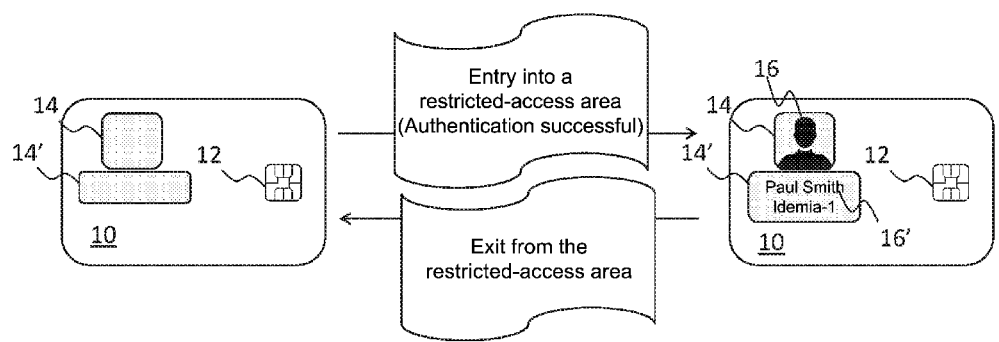
FIG. 1 illustrates the principle of an electronic access pass according to some embodiments of the invention.

FIG. 1 illustrates the principle of an electronic access pass according to some embodiments of the invention.

An electronic access pass according to the invention allows a person associated with this pass to access at least one restricted-access area of a building. To do so, such an electronic access pass typically comprises:
 means for communicating with a pass reader,
 means for displaying information on the electronic access pass,
 a secure element configured to:
 a) ensure securely storing information in the electronic access pass,
 b) authenticate the pass reader, the authentication consisting in verifying that the pass reader is actually associated with a restricted-access area of said building, c) control the sending, by the communication means, to said pass reader, of a first item of information originating from the pass in order to authenticate the electronic access pass so as to authorize access to the restricted-access area associated with the authenticated pass reader, d) select a second item of information stored in the electronic access pass, on the basis of the restricted-access area associated with the authenticated pass reader, and e) control the temporary display, by the display means, of the selected second item of information on the electronic access pass, the display being temporary in that it is disabled upon exiting the restricted-access area associated with the authenticated pass reader.

The first item of information used to authenticate the pass and authorize the access is for example an access right to at least one restricted-access area of the building. This access right corresponds for example to a given access level among several possible access levels. These access levels may typically correspond to clearance levels.

According to some embodiments, the first item of information may comprise a cryptogram. This cryptogram is for example an item of information encrypted or signed by means of a private key stored in the pass. In the case of authentication based on symmetric keys, it may be sufficient to send the cryptogram. For asymmetric authentication, a certificate comprising the public key supplied by a certification authority and corresponding to the private key may also be sent with the first item of information. Thus, in some embodiments, the first item of information is not necessarily stored in the pass, and can be computed from a datum received from the pass reader and from one or more cryptographic keys stored in the pass.

The authentication of the pass reader by the secure element is particularly useful for preventing a third party from being able to read the content of the pass using any chip card reader, for example outside the building and in any case, independent of the restricted-access area to which the pass grants access. Thus, the authentication of the reader makes it possible to prevent the reading of the information of the pass from any given reader via the communication means provided on the pass, and as well as to prevent the display of information on the pass following communication with any reader.

The second item of information enables a visual security check. In practice, it may be a set of items of information to be displayed. It typically consists of personal information characterizing the person associated with the electronic access pass, for example a name, a job title, a photo or a biometric datum (for example: a fingerprint). Likewise, this second item of information may comprise information characterizing the restricted-access area (for example a department name) and/or the building, for example its geographical address. Finally, it is also possible to display an access level of the area or a clearance level associated with this area.

As will be described in greater detail hereunder, in accordance with the embodiments of the invention, the display of the second item of information on the pass proves that an authentication of the pass and/or of the pass reader for the current area has actually taken place.

According to some embodiments, exiting the restricted-access area associated with the authenticated pass reader may correspond to entering another restricted-access area of the building, or simply to exiting the building.

In the example shown in FIG. 1, the electronic access pass 10 is a chip card comprising a secure element 12 as well as display means 14, 14'.

The electronic access pass 10 comprises communication means (not shown) for communicating with a card reader (not shown), for example a terminal.

These communication means are preferably short-range, in other words, establishing the communication requires certain proximity between the pass and the reader. Thus, the communication means according to the invention preferably comprise at least one communication interface, for example in accordance with standard ISO 7816 (communication with contact) or with standards ISO 14443 or NFC/ISO 15693 (contactless communication).

Advantageously, short-range communication means enable access control in all types of premises, including those lacking network coverage (mobile or satellite), for example inside the offices of the Ministry of Defense.

The display means 14, 14' comprise for example at least one electronic screen and/or at least one LED-type indicator light. According to some embodiments, the display means operate with electronic ink (e-link). The use of electronic ink enables energy savings since energy is only required when refreshing the display.

According to some embodiments, the display means 14, 14' only display certain confidential information (personal information about the carrier of the pass or about the company, for example) on the pass if the access control based on this pass has been successful (in other words, if the authentication of the first item of information originating from the pass mentioned above has succeeded).

The left-hand portion of FIG. 1 illustrates the default state of the pass before an access control, as it would be found outside the company premises, for example.

Remarkably, in this default state, the display means 14, 14' do not display any particular information. This makes it possible to avoid revealing information about the person associated with the pass or about the company, outside the premises of the company.

Thus, in this illustrated example, the pass is anonymous and the display means are disabled by default so that they do not make it possible to visually differentiate an electronic access pass associated with a different person or company. This also allows the pass to be reused for example to associate it with a visitor or with a new employee.

According to some embodiments, certain information may be printed permanently on the pass, for example the employee's photo. It is however preferable to avoid the permanent presence of written information (words, abbreviations) or easily recognizable information (company logo for example) about the holder of the pass or about the premises (their address for example).

The right-hand portion of FIG. 1 illustrates the state of the pass after a successful authentication according to some embodiments.

In the example shown, the display means 14, 14' display the photo 16 of the person associated with the pass, as well as information 16' about this person (in this case their name: Paul Smith) and the area entered (in this case the name and the security level of the area: Idemia-1).

According to some embodiments, with every positive access control to enter a new internal area of the premises, the display means 14' update the information about the entered area, for example the security level.

According to some embodiments, the display means 14, 14' are disabled upon exiting the building/a restricted-access area so as to remove the display of some or all of the confidential information (personal information about the carrier of the pass or about the company for example) displayed on the pass inside the exited area.

This disabling typically occurs following an interaction with the pass reader.

According to some embodiments, the secure element is configured to control the disabling of the display means upon detecting a predefined event.

This disabling is preferably decorrelated from the presentation of the pass to a reader, that is it can take place optionally in advance to passing the pass over a reader placed at the exit of the area.

For example, this predefined event corresponds to the expiry of a predefined time from the last authentication of the pass. For example, this time can be defined in the reader and transmitted to the pass by the reader. Alternatively, this time can be defined in the pass. For example the pass contains predefined times for each possible restricted access level. The time is then selected based upon the area to which the pass grants access. In practice, the passage of time can be counted down in the pass by means of an internal clock. In this case, the pass preferably has an internal power source.

According to another example, the predefined event can be the detection or non-detection of a communication network. It can be determined in cooperation with communication means, for example Wi-Fi or Bluetooth, provided on the pass. The inhibition of the display can then be triggered upon detecting that the company's Wi-Fi network is not available. Alternatively, the pass reader can emit information over Bluetooth, for example if the pass is not presented to said reader via a short-range communication means. The pass then inhibits the display of the second item of information upon receiving information from the reader via Bluetooth.

According to yet another example, the predefined event can be linked to geographical information. For this purpose, the pass can be equipped with a GPS chip that disables the display once it leaves the restricted-access area or the building. The pass then comprises an internal power source, for example a battery, or a supercapacitor, so as to be able to operate and detect its removal from the area without an external power input.

These embodiments make it possible to preserve the confidentiality of the information displayed on the pass when outside an area, even when the person does not present the pass to the reader upon exiting the area. These embodiments are thus particularly useful for preserving the confidentiality of the information in the case in which the carrier of the pass exits a restricted-access area passing "behind" or "with" another person, and thus avoiding presenting their pass to a reader.

In any case, the embodiments of the invention are such that the display means do not display confidential information once the pass is taken outside the building, it being understood that the display can be disabled inside the building, upon exiting an area inside the building, for example, or even upon exiting the building.

Additionally, like any conventional chip card, the electronic pass according to the invention comprises appropriate power supply and secure information storage means.

Figure 2:
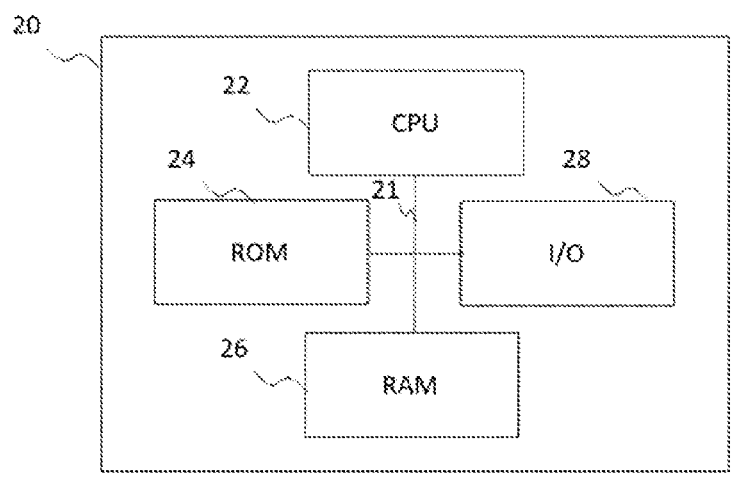
FIG. 2 shows an example of architecture for the electronic access pass of FIG. 1.

FIG. 2 depicts an example of architecture for the electronic access pass of FIG. 1.

In this example, the architecture 20 comprises a communication bus 21 to which the following are connected:

a processing unit—or microprocessor—22 denoted CPU (Central Processing Unit);

one or more non-volatile memory units 24 for example ROM (Read Only Memory) which can constitute a medium according to the invention, that is which can comprise a computer program comprising instructions for implementing a method according to the invention; this non-volatile memory can alternatively be a Flash memory;

a random access memory or cache memory or volatile memory 26, for example RAM (Random Access Memory) comprising registers suitable for storing variables and parameters created and modified during the execution of the above-mentioned program; during the implementation of the invention, the program instruction codes stored in non-volatile memory (e.g. ROM or flash) are loaded into RAM for execution by the CPU; and a communication interface 28 suitable for transmitting and receiving data, for example with a pass reader.

The communication bus allows communication and interoperability between the various elements included in the pass or connected thereto. The depiction of the bus is not limiting and, particularly, the processing unit is likely to communicate instructions to any element of the pass directly or via another element of this pass.

Optionally, the display of information on the access pass can also be conditioned by the authentication of its carrier. The authentication can take place in the pass or in the reader, in which case the result is then transmitted to the pass.

This authentication of the carrier is for example based on personal information (e.g. secret code such as a PIN code, date of birth, biometric data) obtained at the pass or at the reader, and if need be transmitted to one or the other in order to enable the authentication of the carrier.

For this purpose, the electronic access pass and/or the pass reader can comprise means for obtaining a personal datum configured to enable a carrier of the electronic access pass to provide personal information with a view to authenticating the carrier.

For example, the obtaining means are input means such as a keyboard, button or touch screen, configured to allow a carrier of the electronic access pass to enter personal information on the pass and/or a biometric sensor configured to acquire a biometric datum (e.g. fingerprint) from the carrier of the electronic access pass.

Conventionally, the personal datum obtained at the time is compared with a reference datum and the access to the restricted-access area is only authorized if these data match.

According to some embodiments, it is provided for the reader to have access to several reference data (at least one datum per person authorized to access the restricted-access area), and to be able to select the reference datum to be used on the basis of, for example, all or part of an item of information received from the pass and identifying the current carrier.

Figure 3:
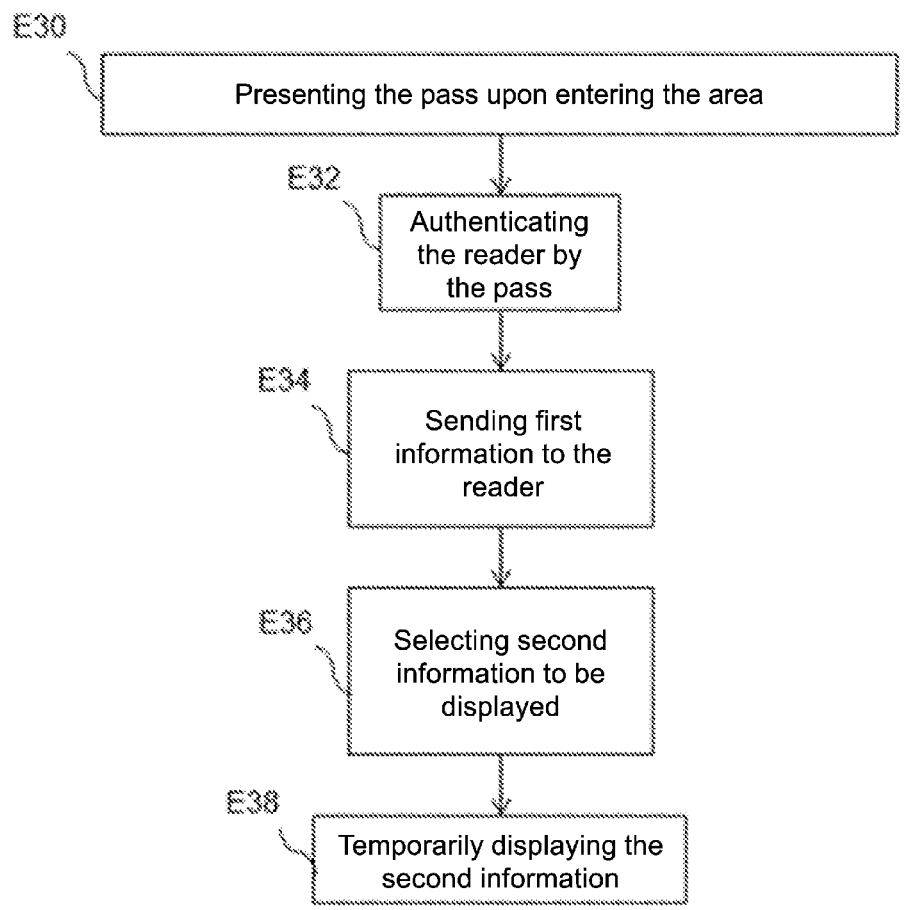
FIG. 3 illustrates, in the form of a flowchart, steps implemented during an example of using an electronic access pass in order to enter a restricted-access area according to some embodiments of the invention.

An example of a use of the electronic access pass according to the invention is disclosed hereunder in reference to FIG. 3.

In this example, a building is considered, consisting of two restricted-access areas having security levels 1 and 2, respectively.

During a first step E30, a person equipped with an electronic access pass as described previously approaches the entrance of a building and presents their electronic access pass to the pass reader provided for this purpose. For example, this entrance is provided with an access gate or door to access the first restricted-access area. In this step, the electronic access pass has, for example, the appearance depicted on the left-hand side of FIG. 1.

During a second step E32, communication is established between the electronic access pass and the reader. During this communication, the secure element and the pass reader exchange information such as the previously mentioned cryptogram, so as to authenticate the pass reader and to make sure that it is actually a pass reader associated with the first restricted-access area of the building, which the person is attempting to access.

If the authentication of the reader is successful, during a step E34, the pass in turn authenticates with the reader in order to obtain authorization to access the first restricted-access area. In order to do so, the pass sends a first item of information directly stored or computed from an item of information stored in the pass. As indicated previously, this first item of information typically indicates an access right to said area. Alternatively, the first item of information does not contain an access right, but only an identifier of the pass. The reader can then find (in its memory or from a server) the access right associated with the pass by virtue of the identifier received.

Thus, the first item of information may be based on an access right associated with the pass or simply an identifier of the pass.

Alternatively, the order of steps E32 and E34 may be reversed.

In case of failure, the method stops and the person must present their pass to the reader again.

If the authentication of the pass is successful, access is granted to the person who presented the pass, the door opens or the gate unlocks.

Optionally, the authenticity of the carrier of the pass can also be verified, for example by means of an item of personal information (PIN code, date of birth, biometric datum), either by the reader, or by the actual pass. Thus, the reader or the pass can compare a reference datum to a personal datum supplied by the person at the time at the reader or at the pass. This verification of authenticity can take place before or after step E34. The method only continues if the authentication of the carrier is successful.

The method continues in step E36 during which the secure element selects a second item of information stored in the electronic access pass, as a function of the restricted-access area associated with the pass reader authenticated in step E32.

As indicated beforehand, the second item of information typically corresponds to personal information that characterizes the person associated with the electronic access pass, for example a name, a job title, a photo or a biometric datum (for example, a fingerprint) and optionally the restricted-access area (for example, a department name) and/or the building, for example its geographical address.

If the carrier is authenticated (optional step), then the second item of information can likewise indicate the authentication mode used to authenticate the carrier of the access pass (PIN code, biometric datum, etc.).

According to some embodiments, the pass may be associated with several carriers and thus contain the data of several carriers. During the selection step E36, the data corresponding to the carrier who is authenticated are selected from all the data of the various carriers.

During a step E38, the display means of the pass activate and display the selected second item of information on the electronic access pass. In this step, the electronic access pass has for example the appearance shown in the right-hand side of FIG. 1.

According to the invention, the display of the selected second item of information is temporary since it is disabled upon exiting the first restricted-access area.

Advantageously, the temporary nature of this display makes it possible to prevent the retrieval of information through a simple glance by a third party, while allowing the authentication of the pass. Indeed, security personnel and peers moving around inside the secure premises can immediately ascertain (visually) that the pass actually authorizes the carrier to move around the premises, without this requiring a pass reader.

As indicated beforehand, the display of some or all of the information displayed can be disabled in a manner decorrelated with the presentation of the pass to a reader, that is optionally before passing the pass over a reader placed at the exit of the area, upon detecting a predefined event.

This predefined event corresponds for example to one of the following events:

the expiry of a predefined time since the last authentication of the pass;
the detection of a communication network, for example a company Wi-Fi network; or
the entry to or exit from a geographical area.

These embodiments make it possible to preserve the confidentiality of the information displayed regardless of any interaction with a pass reader.

Upon the expiry of a predefined time since the last authentication of the pass, the display may be disabled after exiting the current restricted-access area.

However, the display of information outside the restricted-access area only lasts for a limited time even if the pass has not been presented to a reader, thus improving the security of the information displayed with respect to the prior art.

In any case, the invention makes it possible to limit or even avoid the display of confidential information once the pass is taken outside a building.

Figure 4:
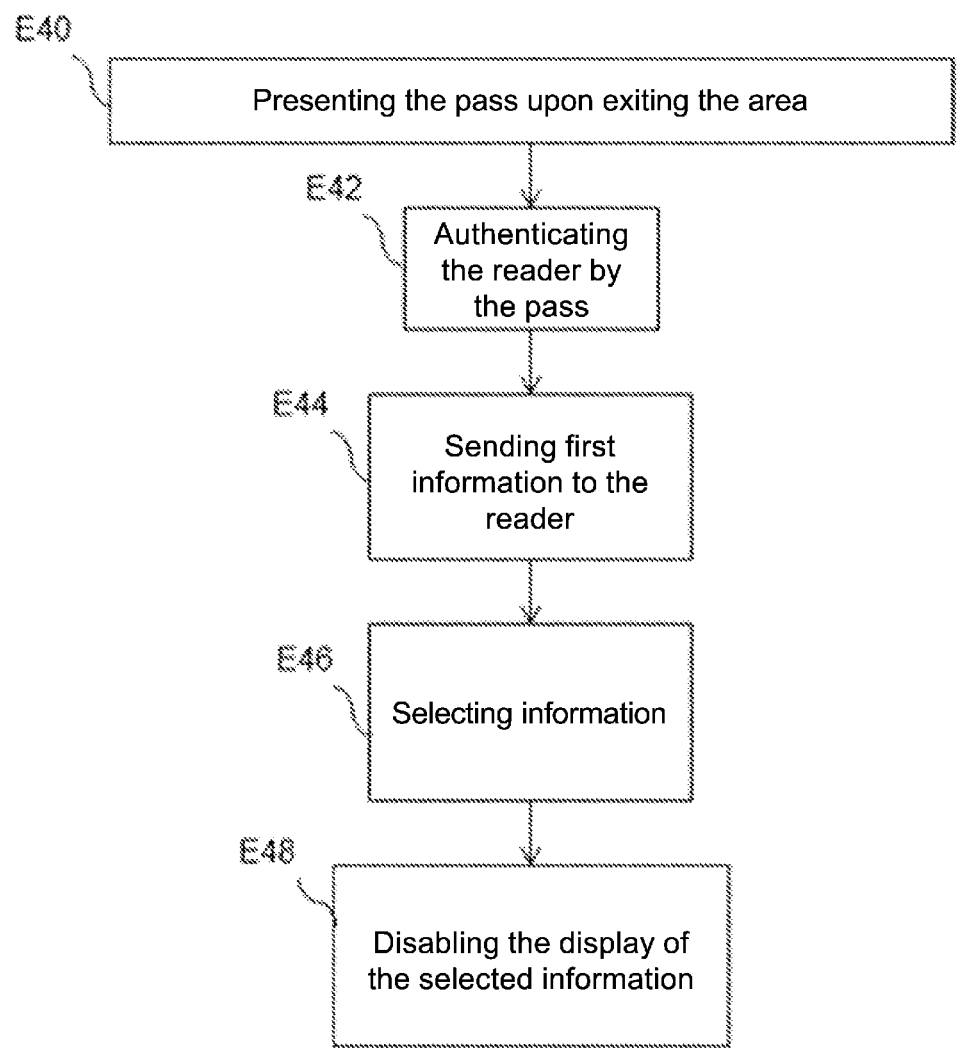
FIG. 4 illustrates, in the form of a flowchart, steps implemented during an example of using an electronic access pass in order to exit a restricted-access area according to some embodiments of the invention.

FIG. 4 shows, in the form of a flowchart, steps implemented during an example of using an electronic access pass in order to exit a restricted-access area according to some embodiments of the invention.

It is presumed in this example that the display of the pass is active when the person presents their pass to the reader in step E40, that is that at least one item of information temporarily displayed in step E38 is still displayed on the pass by the display means.

Steps E40, E42 and E44 are similar to steps E30, E32 and E34, respectively.

Thus, once the person has presented their pass to the reader (step E40) upon exiting a first restricted-access area, and the reader and the pass have authenticated one another (steps E42 and E44), the pass selects (step E46) a displayed item of information, the display of which should be disabled in step E48. Alternatively, the order of steps E42 and E44 may be reversed.

Technically, if several items of information are displayed, the display means can all be completely disabled (for example all the screens provided on the pass are disabled) so that all the information previously displayed disappears visually from the pass.

Alternatively, when passing from a first area to a second internal area of the building, having for example different clearance levels, only certain items of information may be removed from the display (for example in the case of a plurality of screens, only one of the screens may be disabled), optionally in order to be updated. Thus, the displayed clearance level can then be updated.

This variant should, however, be reserved to situations in which the confidentiality of the information which is continued to be displayed is not compromised upon exiting the area. Conversely, when exiting a first area towards a second area that is less secure than the first area, it is preferable to disable the display of all (or part of) the information.

The present invention has been described and illustrated in the present detailed description in reference to the enclosed figures. However, the present invention is not limited to the presented embodiments. Other variants, embodiments and combinations of features may be deduced and implemented by a person skilled in the art from reading the present description and the enclosed figures.

In the claims, the term "comprise" does not exclude other elements or other steps. The indefinite article "a/an" does not exclude the plural. A single processor or several other units may be used to implement the invention. The various characteristics presented and/or claimed may be advantageously combined. Their presence in the description or in different dependent claims does not, in fact, rule out the possibility of combining them. The reference signs should not be understood as limiting the scope of the invention.

The invention claimed is:

1. An electronic access pass allowing a person associated with said pass to access at least one restricted-access area of a building, the electronic access pass comprising:
    a communication system configured to communicate with a pass reader;
    a display system configured to display information on the electronic access pass; and
    a secure element configured to:
        ensure securely storing information in the electronic access pass,
        authenticate the pass reader, the authenticating consisting in verifying that the pass reader is actually associated with a restricted-access area of said building,
        control the sending, by the communication system, to said pass reader, of a first item of information originating from the secure element of the electronic access pass in order to authenticate the electronic access pass to authorize access to the restricted-access area associated with the authenticated pass reader,
        select a second item of information stored in the secure element of the electronic access pass, based on the restricted-access area associated with the authenticated pass reader, and
        control a temporary display, by the display system, of the selected second item of information on the electronic access pass, the temporary display being disabled upon exiting the restricted-access area associated with the authenticated pass reader.

2. The electronic access pass according to claim 1, wherein the communication system provides short-range communication.

3. The electronic access pass according to claim 1, wherein at least one item of information among the first item of information and the second item of information comprises at least one access right to at least one restricted-access area of said building.

4. The electronic access pass according to claim 3, wherein the access right corresponds to a specific access level among a plurality of access levels.

5. The electronic access pass according to claim 1, wherein the first item of information comprises a cryptogram.

6. The electronic access pass according to claim 1, wherein the secure element is configured to control disabling of the display system upon detecting a predefined event.

7. The electronic access pass according to claim 1, wherein the secure element is configured to select the second item of information based on the result of an authentication of a carrier of the electronic access pass.

8. The electronic access pass according to claim 7, wherein the secure element is configured to implement said authentication of the carrier of the electronic access pass.

9. The electronic access pass according to claim 1, further comprising one or more of an input device and a sensor configured to obtain a personal datum configured to enable a carrier of the electronic access pass to provide a personal item of information on the electronic access pass in order to authenticate the carrier.

10. The electronic access pass according to claim 1, wherein the display system comprises at least one light emitting diode (LED) indicator light.

11. The electronic access pass according to claim 1, wherein the display system comprises at least one screen.

12. The electronic access pass according to claim 1, wherein the display system comprises electronic ink.

13. A method implemented by an electronic access pass in order to access a restricted-access area of a building, the method comprising:
    authenticating a pass reader, the authenticating consisting in verifying that the pass reader is actually associated with a restricted-access area of said building;
    sending, to said pass reader, a first item of information originating from the secure element of the electronic access pass in order to authenticate the electronic access pass to authorize access to the restricted-access area associated with the authenticated pass reader;
    selecting a second item of information stored in the secure element of the electronic access pass, based on the restricted-access area associated with the authenticated pass reader; and
    temporarily displaying the selected second item of information on the electronic access pass, the temporary display being disabled upon exiting the restricted-access area associated with the authenticated pass reader.

14. The method according to claim 13, further comprising disabling the display system upon detecting a predefined event.

15. The method according to claim 13, wherein the selecting the second item of information is based upon the result of an authentication of a carrier of the electronic access pass.

* * * * *